(12) United States Patent
Kosuda

(10) Patent No.: US 9,164,878 B2
(45) Date of Patent: Oct. 20, 2015

(54) EVALUATING COVERAGE OF A SOFTWARE TEST

(75) Inventor: Masahiko Kosuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 13/328,151

(22) Filed: Dec. 16, 2011

(65) Prior Publication Data

US 2012/0167059 A1 Jun. 28, 2012

(30) Foreign Application Priority Data

Dec. 24, 2010 (JP) ................................. 2010-287341

(51) Int. Cl.
*G06F 9/44* (2006.01)
*G06F 11/36* (2006.01)

(52) U.S. Cl.
CPC .................................. *G06F 11/3676* (2013.01)

(58) Field of Classification Search
None
See application file for complete search history.

(56) References Cited

U.S. PATENT DOCUMENTS

| | | | |
|---|---|---|---|
| 6,044,398 A | 3/2000 | Marullo et al. | |
| 6,212,675 B1 * | 4/2001 | Johnston et al. | 717/107 |
| 6,898,556 B2 * | 5/2005 | Smocha et al. | 702/186 |
| 7,065,677 B1 * | 6/2006 | Hughes | 714/38.14 |
| 7,114,111 B2 * | 9/2006 | Noy | 714/738 |
| 7,685,273 B1 * | 3/2010 | Anastas et al. | 709/224 |
| 7,904,890 B1 * | 3/2011 | Hsieh et al. | 717/131 |
| 7,912,978 B2 * | 3/2011 | Swildens et al. | 709/235 |
| 8,065,410 B1 * | 11/2011 | Breen et al. | 709/224 |
| 8,141,158 B2 * | 3/2012 | Calendino et al. | 726/25 |
| 8,185,910 B2 * | 5/2012 | Swildens | 719/310 |
| 8,898,647 B2 * | 11/2014 | Sobolev et al. | 717/130 |
| 2003/0120463 A1 | 6/2003 | Cox et al. | |
| 2003/0233600 A1 * | 12/2003 | Hartman et al. | 714/32 |
| 2006/0235947 A1 * | 10/2006 | Gray et al. | 709/218 |
| 2007/0136024 A1 * | 6/2007 | Moser et al. | 702/119 |
| 2008/0282235 A1 * | 11/2008 | Jadhav et al. | 717/131 |
| 2009/0172643 A1 * | 7/2009 | Maruchi et al. | 717/126 |
| 2010/0287534 A1 * | 11/2010 | Vangala et al. | 717/124 |
| 2011/0035631 A1 * | 2/2011 | Bhinge | 714/48 |
| 2011/0138358 A1 * | 6/2011 | Rau et al. | 717/124 |
| 2011/0197176 A1 * | 8/2011 | Muharsky et al. | 717/113 |

(Continued)

FOREIGN PATENT DOCUMENTS

| | | | |
|---|---|---|---|
| JP | S6324425 A | 2/1988 | |
| JP | S63148339 A | 6/1988 | |
| JP | H04275643 A | 10/1992 | |

(Continued)

*Primary Examiner* — Don Wong
*Assistant Examiner* — Hossain Morshed
(74) *Attorney, Agent, or Firm* — Cantor Colburn LLP; Terry Carroll

(57) ABSTRACT

Evaluating the coverage of a test, the evaluating including using an apparatus that includes a storage component, an analysis component, and an output component. The storage component is for storing log data of a plurality of tests. The log data includes a plurality of input values that are input to a specified input field on a specified screen and transmitted to a server in each of the plurality of tests that use the specified screen displayed on a client device. The analysis component is for performing analysis that includes analyzing to what extent the plurality of input values included in the log data stored in the storage component cover values that should be input to the specified input field in the plurality of tests. The output component is for outputting a result of the analyzing from the analysis component.

17 Claims, 19 Drawing Sheets

(56) References Cited

U.S. PATENT DOCUMENTS

2011/0289488 A1* 11/2011 Ghosh ............................ 717/131
2012/0167059 A1* 6/2012 Kosuda .......................... 717/131

FOREIGN PATENT DOCUMENTS

| | | | |
|---|---|---|---|
| JP | 2000112784 A | 4/2000 | |
| JP | 2000267888 A | 9/2000 | |
| JP | 2003044318 A | 2/2003 | |
| JP | 2005107823 A | 4/2005 | |
| JP | 2006113993 A | 4/2006 | |
| JP | 2006227958 A | 8/2006 | |
| JP | 2007026360 A | 2/2007 | |
| JP | 2007133800 A | 5/2007 | |
| JP | 2007328447 A | 12/2007 | |
| JP | 2008158634 A | 7/2008 | |
| JP | 2008262473 A | 10/2008 | |
| JP | 2009181560 A | 8/2009 | |
| JP | 2009288831 A | 12/2009 | |
| JP | 2009301129 A | 12/2009 | |
| JP | 2010113551 A | 5/2010 | |

* cited by examiner

| INITIAL LINE | MESSAGE HEADER | MESSAGE BODY | TARGET ID |
|---|---|---|---|
| POST aaa/bbb.do... | ...2010/12/08 10:10:10... | ...parb1=valb11&parb2=valb21&parb3=valb31... | User1 |
| HTTP/1.1 200... | ...2010/12/08 10:10:11... | ..<html>...</html>... | User1 |
| POST aaa/ccc... | ...2010/12/08 10:12:12... | ...parc1=valc11&parc2=valc21&parc3=valc31... | User1 |
| HTTP/1.1 200... | ...2010/12/08 10:12:13... | ..<html>...</html>... | User1 |
| POST aaa/ddd... | ...2010/12/08 10:14:14... | ...pard1=vald11&pard2=vald21&pard3=vald31... | User1 |
| HTTP/1.1 200... | ...2010/12/08 10:14:15... | ..<html>...</html>... | User1 |
| POST aaa/eee... | ...2010/12/08 10:16:16... | ...pare1=vale11&pare2=vale21&pare3=vale31... | User1 |
| HTTP/1.1 200... | ...2010/12/08 10:16:17... | ..<html>...</html>... | User1 |
| POST aaa/fff... | ...2010/12/08 10:18:18... | ...parf1=valf11&parf2=valf21&parf3=valf31... | User1 |
| HTTP/1.1 200... | ...2010/12/08 10:18:19... | ..<html>...</html>... | User1 |
| ... | ... | ... | ... |

FIG. 4

ANALYSIS-TARGET SETTING SCREEN

TEST PERIOD

TARGET SERVER

TARGET PC

TARGET ID

SCREEN URI INITIAL POINT
SCREEN URI END POINT

LINK TO SCREEN PLAYBACK DEVICE

FIG. 5

APPEARED-PARAMETER LIST SCREEN

| SCREEN URI | |
|---|---|
| SCREEN TITLE | |

| PARAMETER NAME | EXAMPLE OF PARAMETER VALUE | ANALYSIS TARGET | DEPENDENT PARAMETER |
|---|---|---|---|
| | | | |
| | | | |
| | | | |
| | | | |
| | | | |

FIG. 6

DEPENDENT-PARAMETER SETTING SCREEN

SCREEN URI

SIMPLE SAMPLING
PARAMETER NAME
PARAMETER POSITION
(OBTAIN FROM SCREEN PLAYBACK DEVICE)

ADVANCED SAMPLING
PARAMETER NAME
PARAMETER POSITION
(OBTAIN FROM SCREEN PLAYBACK DEVICE)
OBTAINED INFORMATION

FIG. 7

REPETITION-COUNT PARAMETER SETTING SCREEN

COUNT-TARGET SCREEN URI

SIMPLE COUNTING
PARAMETER NAME

ADVANCE COUNTING
PARAMETER NAME

COUNT CONDITION

FIG. 8

| SCREEN URI1 | PARA-METER NAME11 | PARA-METER VALUE11 | PARA-METER NAME12 | PARA-METER VALUE12 | ... | SCREEN URI2 | PARA-METER NAME21 | PARA-METER VALUE21 | PARA-METER NAME22 | PARA-METER VALUE22 | ... |
|---|---|---|---|---|---|---|---|---|---|---|---|
| aaa/bbb.do | parb1 | valb11 | parb2 | valb21 | ... | aaa/ccc | parc1 | valc11 | parc2 | valc21 | ... |
| aaa/bbb.do | parb1 | valb12 | parb2 | valb22 | ... | aaa/ccc | parc1 | valc12 | parc2 | valc22 | ... |
| aaa/bbb.do | parb1 | valb13 | parb2 | valb23 | ... | aaa/ccc | parc1 | valc13 | parc2 | valc23 | ... |
| ... | ... | ... | ... | ... | ... | ... | ... | ... | ... | ... | ... |

FIG. 9

| SCREEN URI | PARA-METER NAME | ANALYSIS-TARGET FLAG | DEPEN-DENT-VARIABLE FLAG | EQUIVA-LENCE-PARTI-TIONING FLAG | EQUIVALENCE CLASS CONDITION1 | EQUIVALENCE CLASS CONDITION2 | EQUIVALENCE CLASS CONDITION3 | ... |
|---|---|---|---|---|---|---|---|---|
| aaa/bbb.do | parb1 | ON | OFF | ON | (hb11,mb11,lb11) | (hb12,mb12,lb12) | (hb13,mb13,lb13) | |
| aaa/bbb.do | parb2 | ON | OFF | ON | (hb21,mb21,lb11) | (hb22,mb22,lb22) | (hb23,mb23,lb23) | |
| aaa/bbb.do | parbx | ON | ON | ON | (hbx1,mbx1,lbx1) | (hbx2,mbx2,lbx2) | (hbx3,mbx3,lbx3) | |
| ... | ... | ... | ... | ... | ... | ... | ... | ... |
| aaa/ccc | parc1 | ON | OFF | ON | (hc11,mc11,lc11) | (hc12,mc12,lc12) | (hc13,mc13,lc13) | |
| aaa/ccc | parc2 | ON | OFF | ON | (hc21,mc21,lc21) | (hc22,mc22,lc22) | (hc23,mc23,lc23) | |
| aaa/ccc | parcy | ON | OFF | ON | (hcx1,mcx1,lcx1) | (hcx2,mcx2,lcx2) | (hcx3,mcx3,lcx3) | |
| ... | ... | ... | ... | ... | ... | ... | ... | ... |

FIG. 11

| SCREEN URI | PARA-METER NAME | PARA-METER VALUE | EQUIVALENCE CLASS FLAG1 | EQUIVALENCE CLASS FLAG2 | EQUIVALENCE CLASS FLAG3 | ... |
|---|---|---|---|---|---|---|
| aaa/bbb.do | parb1 | valb11 | (OFF,ON,OFF) | (OFF,OFF,OFF) | (OFF,OFF,OFF) | |
| aaa/bbb.do | parb1 | valb12 | (OFF,OFF,OFF) | (OFF,ON,OFF) | (OFF,OFF,OFF) | |
| aaa/bbb.do | parb1 | valb13 | (OFF,OFF,OFF) | (OFF,OFF,OFF) | (OFF,ON,OFF) | |
| ... | ... | ... | ... | ... | ... | ... |
| aaa/bbb.do | parb2 | valb21 | (OFF,OFF,OFF) | (OFF,OFF,OFF) | (OFF,ON,OFF) | |
| aaa/bbb.do | parb2 | valb22 | (OFF,OFF,OFF) | (OFF,ON,OFF) | (OFF,OFF,OFF) | |
| aaa/bbb.do | parb2 | valb23 | (OFF,ON,OFF) | (OFF,OFF,OFF) | (OFF,OFF,OFF) | |
| ... | ... | ... | ... | ... | ... | ... |

FIG. 12

SINGLE-FACTOR ANALYSIS RESULT SCREEN (SINGLE PARAMETER)

SCREEN URI　　　　/aaa/bbb.do

VARIABLE NAME　　　parb 1
CATEGORY　　　　　○ANALYSIS TARGET ○EXEMPTION FROM ANALYSIS ○DEPENDENT PARAMETER
PARAMETER NAME
(DESCRIPTIVE)
　　　　　　　　　　○INTEGER ○DECIMAL ○TEXT ○TEXT STRING LENGTH ○LINE NUMBER
EQUIVALENCE　　　　○WITH EQUIVALENCE PARTITIONING ○WITHOUT EQUIVALENCE PARTITIONING
PARTITIONING

| | PARAMETER VALUE |
|---|---|
| BOUNDARY VALUE | |
| RANGE OF EQUIVALENCE CLASS 1 | |
| BOUNDARY VALUE | |
| RANGE OF EQUIVALENCE CLASS 2 | |
| BOUNDARY VALUE | |
| RANGE OF EQUIVALENCE CLASS 3 | |
| BOUNDARY VALUE | |

THE NUMBER OF TESTED EQUIVALENCE CLASSES/TOTAL NUMBER OF EQUIVALENCE CLASSES　　xx/xx
THE NUMBER OF TESTED BOUNDARY VALUES/TOTAL NUMBER OF BOUNDARY VALUES　　　　　　xx/xx ( TO PREVIOUS PAGE )　( TO NEXT PAGE )

FIG. 13

SCREEN-TRANSITION COUNT SCREEN

SEARCH MODE  ○ NO LIMITATION  ○ SPECIFY MAXIMUM TRANSITION COUNT ☐☐☐  ○ INDIVIDUAL INTERACTIVE SEARCH

| TRANSITION-SOURCE SCREEN URI | TRANSITION-SOURCE SCREEN ID | TRANSITION-DESTINATION SCREEN URI ||||| 
| --- | --- | --- | --- | --- | --- | --- |
| | | 1)aaa/bbb.do | 2)aaa/ccc | 3)aaa/ddd | 4)aaa/eee | 5)aaa/fff |
| 1)aaa/bbb.do | SCREEN INDEX IDxxx | | 3 | 4 | | |
| 2)aaa/ccc | SCREEN INDEX IDxxx | 1 | | 2 | | |
| 3)aaa/ddd | SCREEN INDEX IDxxx | | | 3 | | 2 |
| 4)aaa/eee | SCREEN INDEX IDxxx | | | | 2 | 5 |

FIG. 15

| SCREEN URI1 | PARAMETER NAME1 | PARAMETER VALUE1 | SCREEN URI2 | PARAMETER NAME2 | PARAMETER VALUE2 | EQUIVALENCE CLASS FLAG1-1 | EQUIVALENCE CLASS FLAG2-1 | ... |
|---|---|---|---|---|---|---|---|---|
| aaa/bbb.do | parb1 | valb11 | aaa/ccc | parc1 | valc11 | ON | OFF | |
| aaa/bbb.do | parb1 | valb12 | aaa/ccc | parc1 | valc12 | OFF | ON | |
| aaa/bbb.do | parb1 | valb13 | aaa/ccc | parc1 | valc13 | OFF | OFF | |
| ... | ... | ... | ... | ... | ... | ... | ... | ... |
| aaa/bbb.do | parb2 | valb21 | aaa/ccc | parc2 | valc21 | OFF | OFF | |
| aaa/bbb.do | parb2 | valb22 | aaa/ccc | parc2 | valc22 | OFF | ON | |
| aaa/bbb.do | parb2 | valb23 | aaa/ccc | parc2 | valc23 | ON | OFF | |
| ... | ... | ... | ... | ... | ... | ... | ... | ... |

FIG. 16

TWO-DIMENSIONAL-FACTOR ANALYSIS RESULT SCREEN (SINGLE COMBINATION)

TARGET PARAMETER

| SCREEN URI | PARAMETER NAME |
|---|---|
| 1)aaa/bbb.do | parb1 |
| 2)aaa/ccc | parc1 |

| FACTOR-COMBINATION TOTAL | 17 |
|---|---|
| PROHIBITION-COMBINATION TOTAL | 1 |
| TESTED-COMBINATION TOTAL | 15 |
| TOTAL NUMBER OF TEST TIMES | 28 |
| UNTESTED-COMBINATION TOTAL | 2 |

| | | 2) aaa/ccc | | |
|---|---|---|---|---|
| | | parc1 | | |
| | | EQUIVALENCE CLASS1 | EQUIVALENCE CLASS2 | EQUIVALENCE CLASS3 |
| 1)aaa/bbb.do parb1 | EQUIVALENCE CLASS1 | xx/xx xx/xx | xx/xx xx/xx | UNTESTED |
| | EQUIVALENCE CLASS2 | xx/xx xx/xx | xx/xx xx/xx | PROHIBITION |
| | EQUIVALENCE CLASS3 | xx/xx xx/xx | xx/xx xx/xx | xx/xx xx/xx |
| | EQUIVALENCE CLASS4 | xx/xx xx/xx | xx/xx xx/xx | xx/xx xx/xx |
| | EQUIVALENCE CLASS5 | xx/xx xx/xx | xx/xx xx/xx | xx/xx xx/xx |
| | EQUIVALENCE CLASS6 | xx/xx | xx/xx | UNTESTED |

FIG. 17

EVALUATING COVERAGE OF A SOFTWARE TEST

PRIORITY

The present application claims priority to Japanese Patent Application No. 2010-287341, filed on 24 Dec. 2010, and all the benefits accruing therefrom under 35 U.S.C. §119, the contents of which in its entirety are herein incorporated by reference.

BACKGROUND

The present invention relates to an apparatus and a method for evaluating the coverage of a test. More particularly, the present invention relates to an apparatus and a method for evaluating the coverage of a software test operating on a server when a client performs the test.

In web application development, similar to other software development, it is important to check the coverage of software testing to determine whether a sufficient test has been performed. Checking of the testing coverage is performed at the time of execution of the test and upon exit of the test.

There are various techniques and tools to check software test coverage in a white box test. However, in practice, the techniques and tools to check the coverage in the white box test are typically only applied to tests at a component level.

Further, to insure coverage of input parameters in a black box test, there are techniques that can be used such as an equivalence partitioning method, a boundary value analysis, an all-pair method, and the like. There are various tools that assist in using these techniques.

Japanese Patent Publication No. 2009-288831 describes a verification data creation technique. Initially, a value is defined for each factor type. From a plurality of test items constituted by a combination of a predetermined number of factors, a minimum value and a maximum value of a sum of values of all factors constituting the test items are calculated. A plurality of zones are generated such that a range between the minimum value and the maximum value is divided into the plurality of zones. Then, test items are generated so as to cover all combinations of factor types between two factors. Subsequently, for each of the test items, a sum of values of all factors constituting the test item is calculated, and a zone which is not covered by such a sum of values is selected as an uncovered zone. Finally, a test item is generated to cover the uncovered zone.

Japanese Patent Publication No. 2000-267888 describes measuring a software test execution coverage rate. Test point list data and test log data are input, and it is determined whether a test point recorded in the test log data is registered with the test point list data. When the test point is registered, it is assumed that a test corresponding to the test point is finished, and content of the test point list data is updated. After that, by referring to the test point list data which is finally updated, the ratio of test points which have been tested with respect to target points to be tested is calculated, and a result of the calculation is output.

Japanese Patent Publication No. 2009-301129 describes a coverage measurement device that extracts an execution path of a target control program to be tested. Then, a range of input values is specified for a function in the execution path of the control program. Subsequently, a discrete area which is a space obtained by dividing the input range by a predetermined method is set. Finally, the coverage is measured based on an execution rate of a test corresponding to the discrete area.

Japanese Patent Publication No. 2007-026360 describes a technique that includes storing input data as authorized data when the results of a verification test are considered to be appropriate. Further, input data that can be a target in a computer apparatus are collected and stored. Then, the ratio of the number of authorized data to the number of input data that can be a target in the computer apparatus is calculated as a coverage ratio, and the ratio is used for determination on overs and shorts of test cases or test data.

Further, among the techniques described in the above patent publications, there are some techniques related to the retesting of software.

For example, Japanese Patent Publication No. 2007-328447 describes a software test item selecting device which selects test items to be retested from already performed test items. Initially, in order to check whether software constituted by a plurality of modules satisfies each function in a design specification, test item running history information is given to each of a plurality of first test items, which are set beforehand. The test item running history information is associated with running history information for specifying a module of the software that is executed when a given first test item is performed. Then, based on defective module information indicative of modules including a defect and modified module information indicative of a module in which a defect is modified among the modules including a defect, a third test item is obtained. The third test item is obtained by deleting, from the test item running history information, a second test item, which is associated with running history information that includes a module in which a defect is not modified. The third test item is output.

Japanese Patent Publication No. 2008-262473 describes a retesting system. Initially, a unique component identifier parameter, and a unique input-output signal identifier for input-output operation of the component or a screen identifier given as constant information per screen unit on which the component is displayed are added to a software component. Then, along with the unique component identifier parameter, operation information at the time of performing a test, as well as display information, which is a result of the test, are stored in a predetermined place in a trace storage database, for use at the time of performing a retest of modified software.

BRIEF SUMMARY

According to exemplary embodiments, the coverage of a software test is evaluated using an apparatus that includes a storage component, an analysis component, and an output component. The storage component is for storing log data of a plurality of tests. The log data includes a plurality of input values that are input to a specified input field on a specified screen and transmitted to a server in each of the plurality of tests that use the specified screen displayed on a client device. The analysis component is for performing analysis that includes analyzing to what extent the plurality of input values included in the log data stored in the storage component cover values that should be input to the specified input field in the plurality of tests. The output component is for outputting a result of the analyzing from the analysis component.

According to additional exemplary embodiments, a method and computer program product for evaluating the coverage of a test of software includes storing log data of a plurality of tests. The log data includes a plurality of input values that are input to a specified input field on a specified screen and transmitted to the server in each of the plurality of tests that use the specified screen displayed on the client. An analysis is performed to determine to what extent the plurality of input values included in the log data cover values that should be input to the specified input field in the plurality of tests. A result of the analyzing is output.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing, and other features and advantages of the invention are apparent from the following detailed description taken in conjunction with the accompanying drawings in which:

FIG. 4 is a view showing an example of a trace log stored in a coverage measurement apparatus in an embodiment of the present invention;

FIG. 5 is a view showing an example of an analysis-target setting screen to be displayed in a coverage measurement apparatus in an embodiment of the present invention;

FIG. 6 is a view showing an example of an appeared-parameter list screen to be displayed in a coverage measurement apparatus in an embodiment of the present invention;

FIG. 7 is a view showing an example of a dependent-parameter setting screen to be displayed in a coverage measurement apparatus in an embodiment of the present invention;

FIG. 8 is a view showing an example of a repetition-count parameter setting screen to be displayed in a coverage measurement apparatus in an embodiment of the present invention;

FIG. 9 is a view showing an example of test data to be stored in a coverage measurement apparatus in an embodiment of the present invention;

FIG. 11 is a view showing an example of analysis-setting information to be stored in a coverage measurement apparatus in an embodiment of the present invention;

FIG. 12 is a view showing an example of single-factor analysis result information to be stored in a coverage measurement apparatus in an embodiment of the present invention;

FIG. 13 is a view showing an example of a single-factor analysis result screen (single parameter) to be displayed in a coverage measurement apparatus in an embodiment of the present invention;

FIG. 15 is a view showing an example of a screen-transition count screen to be displayed in a coverage measurement apparatus in an embodiment of the present invention;

FIG. 16 is a view showing an example of two-dimensional factor analysis result information to be stored in a coverage measurement apparatus in an embodiment of the present invention;

FIG. 17 is a view showing an example of a two-dimensional-factor analysis result screen (single combination) to be displayed in a coverage measurement apparatus in an embodiment of the present invention;

DETAILED DESCRIPTION

Equivalence partitioning methods and all-pair methods are methods in which, when a test for a test-target system is designed based on a design specification of the test-target system, the test is planned in a top-down manner (from a higher-level design toward a lower-level design) and the method is applied.

In a complicated web application, different page transitions may be involved depending on different conditions and cases. This greatly complicates the sorting-out of necessary parameters from a design specification and the designing of test cases for combinations of parameters, and thus, the application of the above methods becomes difficult.

Testing techniques used to cover input parameters in black box tests are often not applied in web application development. This is because web applications can be complicated, and therefore formation of test cases is also complicated and many man-hours may be required for test design. Some reasons why testing a web application is complicated include: the number of parameters is large; a screen transition should be considered at the same time as another parameter; and not only a direct input parameter, but a combination of parameters with data retrieved from the input parameter is important. An exemplary case is one where the input parameter is a membership number, but since age data derived from the membership number is used in internal processing, it is necessary to design combinations of age data. Thus, in this example, a requirement to check the coverage in the web application development will be difficult to meet using existing testing techniques.

Further complicating the use of existing testing techniques is that the system development process is shifting from a waterfall process to an agile development process. Thus, it is more and more difficult to secure proper test coverage using existing test design methods.

In accordance with an embodiment of the present invention, necessary data are collected from execution results of test cases which are designed and executed by the conventional techniques, so as to provide the following information: what kind of screen transition has been performed; how much coverage the executed test cases would achieve if the equivalence partitioning method or the all-pair method is applied; and what kind of combination of test cases should be performed in order to improve the coverage.

With reference to the attached drawings, the following describes an embodiment of the present invention in detail.

Figure 1:
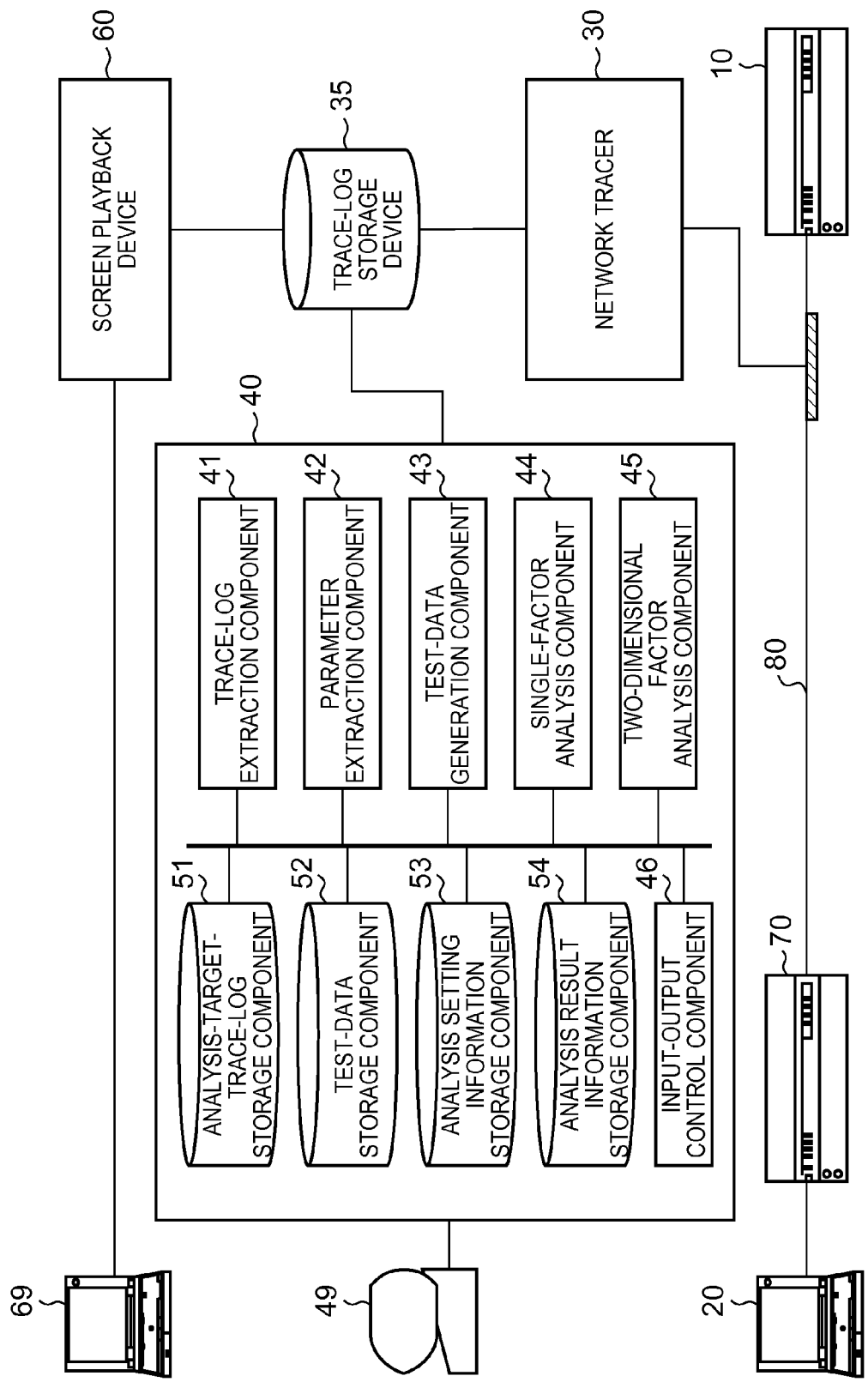
FIG. 1 is a block diagram showing an exemplary configuration of a computer system to which an embodiment of the present invention is applied.

FIG. 1 is a block diagram showing an exemplary configuration of a computer system to which the present embodiment is applied.

As shown in the figure, the computer system is configured such that a web system 10 is connected to a client 20 via a proxy 70, which is a proxy server, and a network 80, which is the Internet or the like. Further, a network tracer 30 is connected to a mirror port or tap of a switch shown by slanted lines on the network 80, and a trace-log storage device 35 is connected to the network tracer 30. Further, a coverage measurement apparatus 40 and a screen playback device 60 are connected to the trace-log storage device 35, a console 49 is connected to the coverage measurement apparatus 40, and a client 69 is connected to the screen playback device 60.

The web system 10 is a system on a server which provides a service in response to a request from a browser installed in each client 20. The web system 10 is a target system to be a tested in the present embodiment. In the present embodiment, as an example of the server, the web system 10 is provided.

In an embodiment, the client 20 is a terminal device to be used when a tester tests the web system 10. In the figure, only one client 20 is shown, but a plurality of clients 20 may be connected, and in that case, the term client 20 shall refer to one of them.

The network tracer 30 acquires a trace of traffic on the network 80.

The trace-log storage device 35 stores therein a log (a trace log) of the trace acquired by the network tracer 30.

The coverage measurement apparatus 40 is an apparatus for measuring the coverage ratio of a test based on a trace log stored in the trace-log storage device 35. Details thereof will be described later.

The console 49 is an operating station for inputting information into the coverage measurement apparatus 40 according to operation of a user of the coverage measurement apparatus 40 (hereinafter, referred to as "a user"), and for displaying information of a result of processing by the coverage measurement apparatus 40.

The screen playback device 60 is a device for playing, at a later point in time, a screen which a tester displayed on the client 20.

The client 69 is a terminal device to be used when a user of the screen playback device 60 displays a screen.

Here, a functional configuration of the coverage measurement apparatus 40 is described in detail.

As shown in the figure, the coverage measurement apparatus 40 includes a trace-log extraction component 41, a parameter extraction component 42, a test-data generation component 43, a single-factor analysis component 44, a two-dimensional factor analysis component 45, and an input-output control component 46. Further, the coverage measurement apparatus 40 includes an analysis-target-trace-log storage component 51, a test-data storage component 52, an analysis setting information storage component 53, and an analysis result information storage component 54. Among them, the trace-log extraction component 41, the parameter extraction component 42, the test-data generation component 43, the single-factor analysis component 44, the two-dimensional factor analysis component 45, and the input-output control component 46 are realized in such a manner that a central processing unit (CPU) 90*a* (see FIG. 19) loads a program from a magnetic disk device 90*g* (see FIG. 19) into a main memory 90*c* (see FIG. 19) to execute the program. Further, the analysis-target-trace-log storage component 51, the test-data storage component 52, the analysis setting information storage component 53, and the analysis result information storage component 54 are realized, for example, by the magnetic disk device 90*g* (see FIG. 19).

The trace-log extraction component 41 extracts a trace log designated as an analysis target from trace logs stored in the trace-log storage device 35, and stores it into the analysis-target-trace-log storage component 51 as a target trace log to be analyzed.

The parameter extraction component 42 extracts parameters that appear on a screen designated as an analysis target, from the target trace log to be analyzed that is stored in the analysis-target-trace-log storage component 51. A parameter is an example of an input field, and the parameter extraction component 42 is an example of an extraction component that extracts an input field.

The test-data generation component 43 generates test data including the parameters extracted by the parameter extraction component 42, and parameter values which are input into those parameters in one test, based on the target trace log to be analyzed that is stored in the analysis-target-trace-log storage component 51, and stores the test data into the test-data storage component 52. A parameter value is used as an example of an input value.

The single-factor analysis component 44 analyzes test coverage related to a single parameter based on the test data stored in the test-data storage component 52 and analysis-setting information (which is described later) stored in the analysis setting information storage component 53, and stores single-factor analysis result information, which shows a result of the analysis, into the analysis result information storage component 54. The single-factor analysis component 44 is an example of an analysis component or a first analysis component for analyzing to what extent a plurality of input values cover values which should be input to a specific input field in a plurality of tests.

The two-dimensional factor analysis component 45 analyzes test coverage related to a combination of two parameters, based on the test data stored in the test-data storage component 52 and analysis-setting information (which is described later) stored in the analysis setting information storage component 53, and stores two-dimensional factor analysis result information, which shows a result of the analysis, into the analysis result information storage component 54. The two-dimensional factor analysis component 45 is provided as an example of an analysis component or a second analysis component for analyzing to what extent a set of a plurality of input values covers a set of values which should be input to two input fields in a plurality of tests.

The input-output control component 46 receives input information from the console 49. Particularly, when analysis-setting information for use in the single-factor analysis component 44 and the two-dimensional factor analysis component 45 is input from the console 49, the input-output control component 46 stores the analysis-setting information into the analysis setting information storage component 53. Further, the input-output control component 46 outputs information which should be displayed on the console 49. The input-output control component 46 is an example of a receiving component for receiving a selection of an input field, and also an example of an output component for outputting an analysis result.

The analysis-target-trace-log storage component 51 stores therein a target trace log to be analyzed that is extracted by the trace-log extraction component 41. In the present embodiment, the analysis-target-trace-log storage component 51 is provided as an example of a storage component for storing log data therein.

The test-data storage component 52 stores therein test data generated by the test-data generation component 43.

The analysis setting information storage component 53 stores therein analysis-setting information received by the input-output control component 46 from the console 49.

Here, the analysis-setting information is setting information for use in analysis of the coverage by the equivalence partitioning method, the boundary value analysis, the all-pair method, or the like, and is information on a range of an equivalence class and boundary values, and the like.

The analysis result information storage component 54 stores therein single-factor analysis result information indicative of a result of the analysis by the single-factor analysis component 44, and two-dimensional factor analysis result information indicative of a result of the analysis by the two-dimensional factor analysis component 45.

Note that, in this exemplary configuration, the network tracer 30 acquires a trace of traffic on the network 80 as a trace log, however other methods of acquiring the trace log may also be implemented.

First, a method in which a log in the web system 10 is acquired as a trace log is considered. However, in this method, it is normally necessary for the method to be adapted by each application of the web system 10.

Second, a method in which a log in a network relay device such as the proxy 70 or the like is acquired as a trace log is considered.

Third, a method in which a logger is used in the client 20 and its log is acquired as a trace log is considered.

Next is a description of operation of the coverage measurement apparatus 40 in the present embodiment.

Initially, the coverage measurement apparatus 40 loads, into its memory (not shown in the figure), a trace log stored in the trace-log storage device 35, and performs preprocessing on the trace log on the memory. In an embodiment, the preprocessing includes removing an invalid packet, arranging entries in chronological order and sorting trace logs per client 20, and restoring compressed data.

Figure 2:
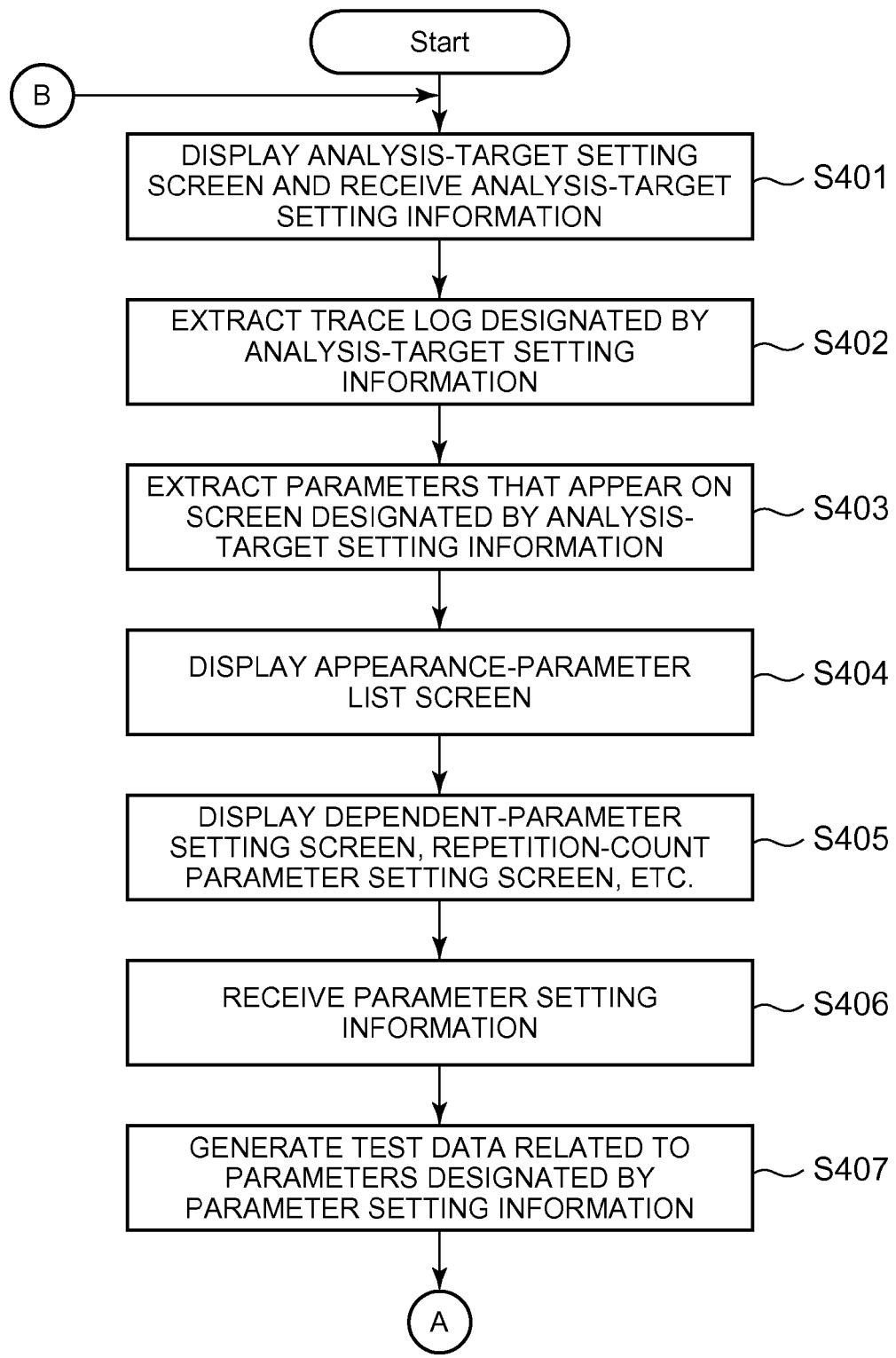
FIG. 2 is a flowchart showing an exemplary operation of a coverage measurement apparatus in an embodiment of the present invention.
Figure 3:
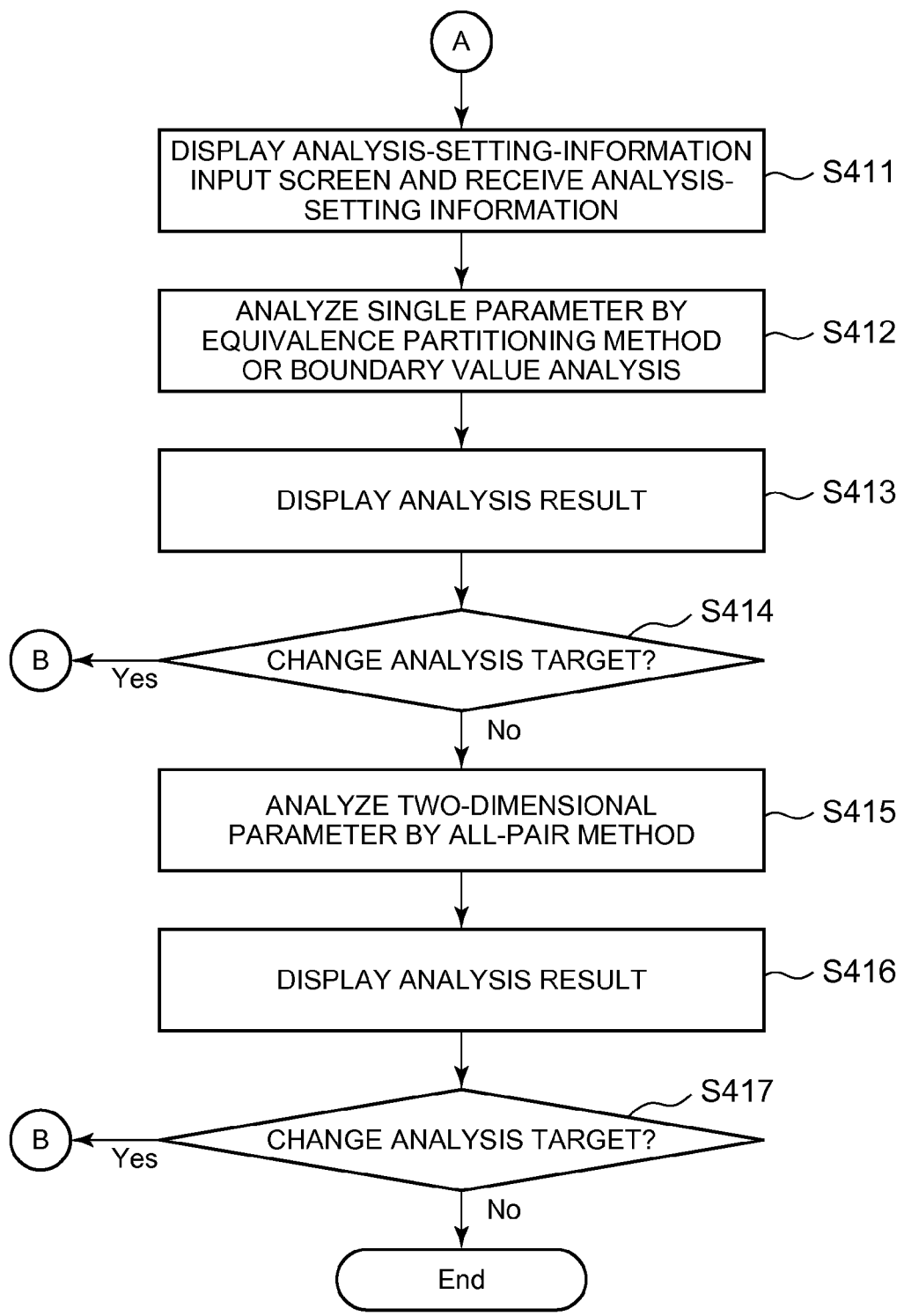
FIG. 3 is a flowchart showing an exemplary operation of a coverage measurement apparatus in an embodiment of the present invention.

FIG. 2 and FIG. 3 are flowcharts each showing an example of subsequent operation of the coverage measurement apparatus 40.

In the coverage measurement apparatus 40, as shown in FIG. 2, the input-output control component 46 initially displays a screen (an analysis-target setting screen) for designating an analysis target on the console 49, and receives analysis-target setting information input via the analysis-target setting screen (block S401). The trace-log extraction component 41 accordingly extracts, from a trace log subjected to the preprocessing, a trace log designated by the analysis-target setting information, and stores it into the analysis-target-trace-log storage component 51 as a target trace log to be analyzed (block S402).

Then, the parameter extraction component 42 extracts parameters that appear on a screen designated by the analysis-target setting information, from the target trace log to be analyzed stored in the analysis-target-trace-log storage component 51 (block S403). The input-output control component 46 accordingly displays a screen which shows a list of the parameters extracted by the parameter extraction component 42 on the console 49 (block S404).

Further, although this block is not necessarily essential, the input-output control component 46 displays a screen (a dependent-parameter setting screen) for designating a dependent parameter, a screen (a repetition-count parameter setting screen) for designating a repetition-count parameter, and the like, on the console 49 depending on a user requirement (block S405).

In block S403, the parameters are extracted from POST data in a HTTP (hypertext transfer protocol) request from the client 20 to the web system 10. In the meantime, there is a parameter whose value is set in the web system 10 based on such parameters. An example of the parameter is a parameter such as a gender to be set in the web system 10 according to a member number input in the client 20. In view of this, the dependent-parameter setting screen is displayed so that such a parameter whose value is set in the web system 10 can be extracted as a dependent parameter from an HTTP response from the web system 10 to the client 20. Here, an example of a dependent parameter is the value which is set in a server according to an input value, and which is transmitted to a client.

Further, when the repetition-count parameter setting screen is displayed, the test coverage can be analyzed by taking, as one factor, a repetition-count parameter storing therein the number of times that the same screen is displayed.

In addition, a screen for specifying information, e.g., test environment such as an operating system (OS) type and a browser type of the client 20, a network path, a version of an application in the web system 10, an authority of a user, and the like is displayed so as to input such information, and the test coverage may be analyzed by taking, as factors, parameters that store the input information.

Then, the input-output control component 46 receives input of such parameter setting information from these screens (block S406). The test-data generation component 43 accordingly generates test data including parameters designated by the parameter setting information, and parameter values which are input to those parameters in one test, and then stores the test data into the test-data storage component 52 (block S407).

Subsequently, in the coverage measurement apparatus 40, as shown in FIG. 3, the input-output control component 46 displays a screen (an analysis-setting-information input screen) for inputting analysis-setting information, and stores analysis-setting information input via the analysis-setting-information input screen into the analysis setting information storage component 53 (block S411). Here, the analysis-setting information includes information of a range of an equivalence class and boundary values, and the like for use in the equivalence partitioning method, the boundary value analysis, and the all-pair method.

Then, the single-factor analysis component 44 analyzes a single parameter as a factor by the equivalence partitioning method and the boundary value analysis, and stores a result of the analysis as single-factor analysis result information into the analysis result information storage component 54 (block S412). Note that, in this case, the single factor analysis is performed on not only parameters initially displayed in block S404, but also all parameters that are finally designated in block S406. In other words, with respect to all of these parameters, the analysis of to what extent parameter values input to a parameter cover values to be input or set to the parameter is performed. The input-output control component 46 accordingly edits the single-factor analysis result information stored in the analysis result information storage component 54, and displays a screen (a single-factor analysis result screen), which shows a single-factor analysis result, on the console 49 (block S413).

Subsequently, the input-output control component 46 determines whether or not information indicative of changing of the analysis target has been input from the console 49 (block S414).

If it is determined that the information indicative of changing of the analysis target has been input from the console 49 as a result of block S414, the processes of blocks 401S to 413S are performed on another analysis target.

On the other hand, if it is not determined that the information indicative of changing of the analysis target has been input from the console 49, the process proceeds to a process by the two-dimensional factor analysis component 45.

That is, the two-dimensional factor analysis component 45 initially analyzes a screen transition and displays a screen (a screen-transition count screen) showing a result of the analysis, followed by performing analysis by the all-pair method by taking a two-dimensional parameter as a factor, and then storing a result of the analysis into the analysis result information storage component 54 as two-dimensional factor analysis result information (block S415). Note that, in this case, the two-dimensional factor analysis is performed on not only parameters initially displayed in block S404, but also all parameters finally designated in block S406. In other words, with respect to all these parameters, the analysis of to what extent a set of parameter values input to a set of parameters covers a set of values to be input or set to the set of parameters is performed. The input-output control component 46 accordingly edits the two-dimensional factor analysis result information stored in the analysis result information storage component 54, and displays a screen (a two-dimensional-factor analysis result screen), which shows a result of the two-dimensional factor analysis, on the console 49 (block S416).

Subsequently, the input-output control component 46 determines whether or not information indicative of changing of the analysis target has been input from the console 49 (block S417).

If it is determined that the information indicative of changing of the analysis target has been input from the console 49 as a result of block S417, the processes of blocks S401 to S416 are performed on another analysis target.

On the other hand, if it is not determined that the information indicative of changing the analysis target has been input from the console 49, the process is completed.

The following describes the operation of the present embodiment, more specifically.

FIG. 4 is a view showing an example of a trace log to be used in the present embodiment. A trace log stored in the trace-log storage device 35 includes Interne protocol (IP) addresses of the web system 10 and the client 20. However, the trace log herein refers to a trace log that is stored as one related to a specific web system 10 and a specific client 20 as a result of sorting trace logs into corresponding web systems 10 and corresponding clients 20 in the preprocessing.

As shown in the first row in the figure, the trace log includes an initial line, a message header, a message body, and a target identifier (ID). Among them, the initial line, the message header, and the message body are obtained from an HTTP message. The target ID is, for example, a tester ID for identifying a tester which is input when a tester logs in the client 20. Such a tester ID is set as the target ID.

Further, the second row is an HTTP request transmitted from the client 20 to the web system 10. More specifically, as shown in the initial line, the second row is an HTTP request for sending data to a screen URI (uniform resource identifier) named "aaa/bbb.do" in a POST method, and as shown in the message body, "valb11", "valb21", and "valb31" are sent as variable values for variable names "parb1", "parb2", and "parb3", respectively.

Further, the third row is an HTTP response transmitted from the web system 10 to the client 20, and as shown in the message body, a HTML (hypertext markup language) file is sent.

In a state where such trace logs are stored, the analysis-target setting screen is displayed in block S401.

FIG. 5 is a view showing an example of the analysis-target setting screen used by an embodiment.

As shown in the figure, on the analysis-target setting screen, a test period, a target server, a target personal computer (PC), a target ID, and a screen URI can be input as the analysis-target setting information.

The test period is an optional input field, and is input to narrow down the trace logs by time and date in the message header.

The target server is an optional input field, and is input to select a trace log related to a specific web system 10. When it is not input, trace logs related to all the web systems 10 are targeted for the analysis.

The target PC is an optional input field, and is input to select a trace log related to a specific client 20. When it is not input, trace logs related to all the clients 20 are targeted for the analysis.

The target ID is an optional input field, and is input to narrow down the trace logs by target ID. When it is not input, trace logs related to all target IDs are targeted for the analysis.

A screen uniform resource identifier (URI) initial point is an optional input field, and is input to narrow down trace logs by a screen URI in the initial line.

A screen URI end point is an optional input field, and is input when pluralities of screens are targeted for the analysis. When it is not input, only one screen designated by the screen URI initial point is targeted for the analysis.

Note that when all of these input fields are blank, all trace logs stored are targeted for the analysis.

When the analysis-target setting information is input as such, the trace logs are narrowed down by the analysis-target setting information, and stored in the analysis-target-trace-log storage component 51 as target trace logs to be analyzed in block S402. Then, in block S403, variable names that appear on screens of a screen URI designated between the screen URI initial point and the screen URI end point which are set by the analysis-target setting information are extracted.

These extracted variable names are displayed on an appeared-parameter list screen in block S404. FIG. 6 is a view showing an example of the appeared-parameter list screen.

As shown in the figure, the appeared-parameter list screen displays a screen URI, a screen title, a parameter name, an example of a parameter value, analysis-target indication, and dependent-parameter indication. Note that the analysis-target indication and the dependent-parameter indication are just referred to "analysis target" and "dependent parameter", respectively, in the figure.

The screen URI is a screen URI designated between the screen URI initial point and the screen URI end point of FIG. 5.

The screen title is a title of a screen of the designated screen URI, and words described in a title tag in an HTML file sent as an HTTP response are set.

As for the parameter name, initially, a list of variables included in the screen of the designated screen URI is displayed. However, it is also possible to assign to the variables parameter names that are easily distinguishable for people, on an analysis-setting-information input screen (which is described later). In view of this, the parameter name is used herein. Note that a variable name may be used as the parameter name without any change. For example, if the designated screen URI is "aaa/bbb.do" of the second row in FIG. 4, variable names "parb1," "parb2," and "parb3" are displayed. In this case, these variable names can be used as parameter names without any change.

The example of a parameter value is the parameter value which corresponds to the parameter name. If the designated screen URI is "aaa/bbb.do" of the second row in FIG. 4, for example, a parameter value "valb11" is displayed to the parameter name "parb1," a parameter value "valb21" is displayed to the parameter name "parb2," and a parameter value "valb31" is displayed to the parameter name "parb3."

The analysis target indication is a flag indicative of whether or not a corresponding parameter is targeted for the analysis. When a parameter is extracted from the screen of the designated screen URI for the first time, any setting of whether or not the parameter is targeted for the analysis is not performed yet, and therefore the analysis target indication is blank. When such a setting is performed on an analysis-setting-information input screen (which is described later), the setting is reflected thereto.

The dependent-parameter indication is a flag indicative of whether or not a corresponding parameter is a dependent parameter. When a parameter is extracted from the screen of the designated screen URI for the first time, the dependent-parameter information is blank because no dependent parameter has not listed in the parameter. When a dependent parameter is designated on a dependent-parameter setting screen, which is described next, the designation is reflected thereto.

Thus, in block S405, the dependent-parameter setting screen is displayed.

FIG. 7 is a view showing an example of the dependent-parameter setting screen. Here, the dependent parameter is a parameter that a tester cannot input directly. Examples of the dependent parameter are a value and a text string which can be acquired from a response screen from a server, or an internal variable that has a hidden attribute and is used for an ID and the like.

As shown in the figure, on the dependent-parameter setting screen, a screen URI, a parameter name, a parameter position, and obtained information can be input as the parameter setting information. Further, the dependent-parameter setting screen is provided with a button of "Obtain from Screen Playback Device", too.

The screen URI is a URI of a response screen from which a dependent parameter is taken.

The parameter name can be optionally specified by a user in the case of simple sampling or advanced sampling.

The parameter position is a relative position in a response screen, such as a character string or a value to be taken, in the case of sampling or advanced sampling. The response screen is described by HTML, so that the relative position in the response screen can be uniquely designated by an XPath expression or the like.

Alternatively, the relative position in the response screen can be designated on a screen displayed by clicking a button of "Obtain from Screen Playback Device". That is, when the button of "Obtain from Screen Playback Device" is clicked, an intended response screen from which a dependent parameter is to be taken is displayed among screens played by the screen playback device 60. Then, by right-clicking a text string, a value, or the like to be taken on this response screen, a corresponding XPath expression can be obtained by a function such as an add-in function of a browser.

The obtainable information is information that can be designated only in the case of advanced sampling, and is information that is not displayed directly on the response screen. An example of such information is a total line number displayed in a search result. That is, the line number of a search result displayed at a position designated by the parameter position on the response screen is counted and formed into a parameter. For example, the line number of a search result is assumed as a factor, and with respect to this factor, such levels are defined as hitless, the number of hits that can be displayed in one screen, the number of hits to be displayed over two screens. Thus, the coverage ratio can be checked.

Then, the dependent parameters designated on this dependent-parameter setting screen are added to the appeared-parameter list screen of FIG. 6. At this time, it is also displayed that these parameter are dependent parameters by the dependent-parameter indication.

Note that, when all the input fields in this dependent-parameter setting screen are blank, no dependent parameter is designated.

Further, in block S405, a repetition-count parameter setting screen is displayed, too.

FIG. 8 is a view showing an example of the repetition-count parameter setting screen.

As shown in the figure, on the repetition-count parameter setting screen, a count-target screen URI, a parameter name, and a count condition can be input as parameter setting information.

The count-target screen URI is a URI of a target screen for which the number of repetition times is counted.

The parameter name is a name of a parameter in which to store the number of repetition times of the screen of the count-target screen URI, and can be designated by a user optionally.

The count condition is a condition to count the number of repetition times of the screen of the count-target screen URI. An example of this count condition is a condition to count the number of repetition times of a specific screen transition. More specifically, when the screen transition occurs in the order of a screen X, a screen Y, a screen A, a screen B, a screen C, the screen A, the screen B, the screen C, and a screen D, the repetitions of the screen transition of the screen A, the screen B, and the screen C are counted. Accordingly, in a case where, in a mail-order system, a payment operation is performed after an operation of choosing a product and putting it into a cart is repeated several times, for example, it is possible to take as a parameter how many times the operation of choosing a product and putting it into a cart is repeated.

Then, the repetition-count parameter designated on this repetition-count parameter setting screen is added to the appeared-parameter list screen of FIG. 6.

Note that, when all the input fields in this repetition-count parameter setting screen are blank, the repetition-count parameter is not designated.

When the parameter setting information designating the parameters (except a parameter that is not targeted for the analysis) shown in FIG. 6 is finally input as such, the parameter setting information is received in block S406. Then, in block S407, test data related to the parameters designated by the parameter setting information is generated from the target trace logs to be analyzed, and is stored into the test-data storage component 52.

FIG. 9 is a view showing an example of this test data.

In the figure, as shown in the first row, the test data includes a screen URIm, a parameter name mn, and a parameter value mn (m=1, 2, ..., n=1, 2, ...). The screen URIm is a URI of the m-th screen of target screens be analyzed, the parameter name mn is a name of the n-th parameter on a screen of the screen URIm, and the parameter value mn is a parameter value input to a parameter of the parameter name mn. Herein, for convenience of explanation, test data in which various parameter values are input to the same parameter (parameters of parameter names 11, 12, 21, and 22) on the same screen (a screen URI1, a screen URI2) in three tests is shown.

When the test data is stored as such, the analysis-setting-information input screen is displayed in block S411.

Figure 10:
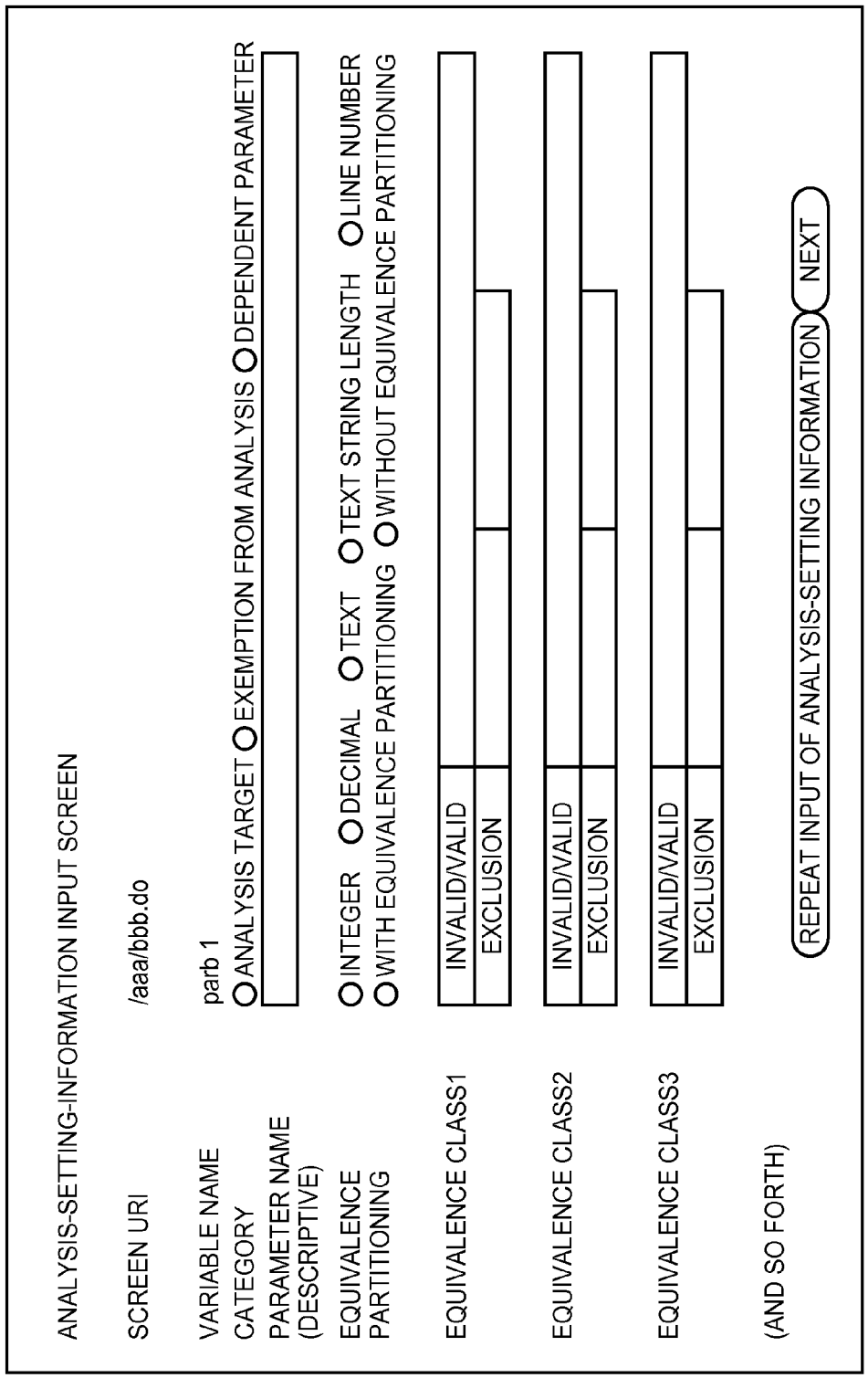
FIG. 10 is a view showing an example of an analysis-setting information input screen to be displayed in a coverage measurement apparatus in an embodiment of the present invention.

FIG. 10 is a view showing an example of the analysis-setting-information input screen.

As shown in the figure, on the analysis-setting-information input screen, with respect to variables designated by variable names on the screen designated by the screen URI, a category, a parameter name, equivalence partitioning information, equivalence class information k (k=1, 2, ... ) can be input. Note that the equivalence partitioning information and the equivalence class information k are just referred to as "equivalence partitioning" and "equivalence class k", respectively, in the figure.

In the category, it is possible to designate whether a variable designated by a variable name is assumed as an analysis target or an exemption from analysis. Many parameters are extracted from an HTTP request, but it is not necessary to calculate the coverage ratio for all the parameters. Accordingly, a parameter which requires the calculation of the coverage ratio is designated here. The setting of the analysis target or the exemption from analysis here is displayed as analysis-target information on the appeared-parameter list screen. Further, in the category, it is also displayed whether the variable is a dependent parameter or not. In other words, it is shown that a parameter designated on the dependent-parameter setting screen is a dependent parameter.

The parameter name is a name to be given to a variable shown by a variable name so that a user can easily distinguish the variable. For example, the term "seibetsu" in POST data or a URL may be directly used as a parameter name, but it is also possible to change it to an easily-distinguishable name such as "gender" "gender of a purchaser," "gender of a child," or the like.

The equivalence partitioning information is basic information when the equivalence partitioning method is applied, and can designate a variable type designated by a variable name or whether equivalence partitioning is performed or not. Here, when a field "with equivalence partitioning" is checked, subsequent equivalence class information is input. When a field "without equivalence partitioning" is checked, the input of the subsequent equivalence class information is unnecessary.

In the equivalence class information k, it is possible to designate whether an equivalence class k is an invalid equivalence class or a valid equivalence class, in an upper-left box. When the invalid equivalence class is designated, the equivalence class k is excluded in the analysis by the all-pair method. Further, in an upper-right box, it is possible to input a conditional expression showing a range of the equivalence class k. As a format of this case, a mathematical expression is used for numeric data, while a list form is used in for a text string or the like. Further, in a lower-leftmost box, it is possible to designate whether the equivalence class k is excluded or not. Here, "exclusion" is an operation in which when any value within the equivalence class k does not appear because of error checking, that fact is clearly stated so as to prevent that it is determined that the equivalence class k has not been tested yet. Furthermore, to a lower-central box, an upper-limit boundary value of the equivalence class k can be input. In the meantime, to a lower-rightmost box, a lower-limit boundary value of the equivalence class k can be input. However, when such a boundary value does not make any sense, for example, when the equivalence class does not have an upper limit or when a variable type is a text, N/A is input.

Note that, information input from this analysis-setting-information input screen may be performed by manual input, but when a design tool and a framework are used for designing of an application, it is possible to perform a collaborative operation of importing data from the design tool or framework.

Then, the analysis-setting information is input from this analysis-setting-information input screen, and is stored into the analysis setting information storage component 53. FIG. 11 is a view showing an example of this analysis-setting information.

In the figure, as shown in the first row, the analysis-setting information includes a screen URI, a parameter name, an analysis-target flag, a dependent-variable flag, and an equivalence-partitioning flag, and an equivalence class condition k (k=1, 2, ... ).

The screen URI is a screen URI displayed on the analysis-setting-information input screen, and the parameter name is a parameter name corresponding to a variable name displayed on the analysis-setting-information input screen.

The analysis-target flag is a flag indicative of whether a corresponding parameter is taken as an analysis target or an exemption from analysis. Here, "ON" indicates that the parameter is taken as the analysis target, and "OFF" indicates that the parameter is taken as the exemption from analysis. The dependent-variable flag is a flag indicative of whether or not a corresponding parameter is a dependent parameter. Here, "ON" indicates that the parameter is a dependent parameter, and "OFF" indicates that the parameter is not a dependent parameter. To these two flags, information of the category on the analysis-setting-information input screen is reflected.

The equivalence-partitioning flag is a flag indicative of whether or not equivalence partitioning is performed on a corresponding parameter. Here, "ON" indicates that equivalence partitioning is performed, and "OFF" indicates that equivalence partitioning is not performed. To this flag, the setting of "with equivalence partitioning" or "without equivalence partitioning" in the equivalence partitioning information on the analysis-setting-information input screen is reflected.

The equivalence class condition k is a condition to determine a range and boundary values of the equivalence class k, and is formed from the conditional expression for the range and the boundary values of the equivalence class information k on the analysis-setting-information input screen. Respective marks in a parenthesis shown in each of the second row and its subsequent rows represent, in the order from the left: a condition (hereinafter referred to as "upper-limit condition") to determine an upper-limit boundary value; a condition (hereinafter referred to as "range condition") to determine a range; and a condition (hereinafter referred to as "lower-limit condition") to determine a lower-limit boundary value.

Note that, in FIG. 11, as parameters that do not exist in the trace log in FIG. 4, a dependent parameter "parx" and a repetition-count parameter "pary" are also shown.

Subsequently, in block S412, the single factor analysis is performed, and single-factor analysis result information is generated and stored into the analysis result information storage component 54. FIG. 12 is a view showing an example of the single-factor analysis result information.

In the figure, as shown in the first row, the single-factor analysis result information includes a screen URI, a parameter name, a parameter value, and an equivalence class flag k (k=1, 2, ... ).

The screen URI is a URI of a target screen to be analyzed, the parameter name is a name of a target parameter to be analyzed on the screen, and the parameter value is a value input to the parameter. These pieces of information are taken from one entry of test data.

The equivalence class flag k is a flag indicative of whether or not a corresponding parameter value satisfies an upper-limit condition, a range condition, and a lower-limit condition of an equivalence class condition k, which is associated by the analysis-setting information with a corresponding screen URI and a corresponding parameter name. Here, "ON" indicates that each condition is satisfied, and "OFF" indicates that each condition is not satisfied.

When the single-factor analysis result information is stored as such, the single-factor analysis result screen is displayed in block S413.

FIG. 13 is a view showing an example of the single-factor analysis result screen (single parameter).

As shown in the figure, the single-factor analysis result screen (single parameter) displays a category, a parameter name, equivalence partitioning information, a parameter-value list, equivalence-class coverage, and boundary-value coverage with respect to a variable designated by a variable name on a screen designated by the screen URI.

The category, the parameter name, and the equivalence partitioning information are the same as those explained in FIG. 10, and therefore are not explained here.

The parameter-value list is a list showing parameter values input to a target parameter to be analyzed, by sorting them according to a range of an equivalence class and boundary values. For example, in FIG. 12, if an equivalence class flag k corresponding to a certain parameter value is (ON, OFF, OFF), the parameter value is displayed in a field corresponding to the upper-limit boundary value of the equivalence class k; if the equivalence class flag k corresponding to the certain parameter values is (OFF, ON, OFF), the parameter value is displayed in a field corresponding to the range of the equivalence class k; and if the equivalence class flag k corresponding to the certain parameter value is (OFF, OFF, ON), the parameter value is displayed in a field corresponding to the lower-limit boundary value of the equivalence class k.

Note that when a field of "exemption from analysis" is checked in the category of FIG. 10, an input parameter value may be directly displayed without showing any distinction by "boundary value", "range of equivalence class 1," or the like. In addition, when a field of "without equivalence partitioning" is checked in the equivalence partitioning information of FIG. 10, an input parameter value is also directly displayed without showing any distinction by "boundary value", "range of equivalence class 1," or the like. Further, a row of a boundary value to which N/A is designated in FIG. 10 is grayed out.

Moreover, in this parameter-value list, a row of a boundary value or a range of an equivalence class that is not tested may be highlighted. In an embodiment, the background color of such a row is made red.

The equivalence-class coverage is information for the target parameter to be analyzed, indicative of how many equivalence classes there are and how many equivalence classes are finished with a test among them.

The boundary-value coverage is information for the target parameter to be analyzed, indicative of how many boundary values there are and how many boundary values are finished with a test among them.

Figure 14:
FIG. 14 is a view showing an example of a single-factor analysis result screen (summary) to be displayed in a coverage measurement apparatus in an embodiment of the present invention.

Further, FIG. 14 is a view showing an example of the single-factor analysis result screen (summary).

As shown in the figure, the single-factor analysis result screen (summary) displays, to an analysis-target screen URI group: the equivalence-class coverage and equivalence-class coverage ratio of all parameters; the boundary-value coverage and boundary-value coverage ratio of all parameters; the equivalence-class coverage and equivalence-class coverage ratio per parameter; and the boundary-value coverage and boundary-value coverage ratio per parameter.

The equivalence-class coverage per parameter is information for each parameter, indicative of how many equivalence classes there are and how many equivalence classes are finished with a test among them, and the equivalence-class coverage ratio per parameter expresses it in percentage. Note that a parameter to which the field of "exemption from analysis" is checked in the category of FIG. 10 is not displayed here.

The equivalence-class coverage of all parameters is information obtained by adding up the equivalence-class coverage of all parameters, and the equivalence-class coverage ratio of all parameters expresses it in percentage.

Subsequently, in block S415, the two-dimensional factor analysis is performed.

In the two-dimensional factor analysis, it may be necessary to check the coverage related to a combination of a parameter that appears in a certain screen and a parameter that appears in another screen, in some cases. In view of this, initially, it is necessary to check whether the screen transition is covered, and therefore a screen-transition count screen showing a result of analysis of the screen transition is displayed. Note that the analysis of the screen transition can be performed, for example, by following screen URIs in chronological order in the test data of FIG. 9.

FIG. 15 is a view showing an example of the screen-transition performance screen.

As shown in the figure, the screen-transition count screen displays a search mode and a screen-transition table.

As the search mode, any of "no limitation," "maximum transition count specification," and "individual interactive search" can be selected. Among them, the "no limitation" is a mode for searching for a screen in an entire range from a screen URI initial point to a screen URI end point which is designated on the analysis-target setting screen. The "maximum transition count specification" is a mode for searching for a screen without involving as many unnecessary screens as possible, by limiting the number of screen transitions from the screen URI initial point. The "individual interactive search" is a mode for searching for only a focused screen transition path by repeating an operation of designating a certain screen and searching for a transition-destination screen transited from the certain screen.

The screen-transition table shows how many times the transition from a screen of a transition-source screen URI to a screen of a transition-destination screen URI is performed, in a cell at which the row of the transition-source screen URI and the column of the transition-destination screen URI intersect with each other. Here, in the transition-source screen URI, a transition-source screen ID is shown additionally for easy recognition of a transition-source screen. Alternatively, a head tag may be shown. Further, in a case where the "individual interactive search" is selected in the search mode, such a configuration may be adopted that when a given transition-destination screen URI is clicked, it is taken as a transition-source screen URI and a row showing the number of transition-destination screens transited from a screen thereof is added.

Note that, as to this screen-transition count screen, the collaborative operation with a design tool and a framework can be performed, too. Examples thereof are that a possible screen transition in terms of design is taken from the design tool or the framework, and a transition which is possible in terms of design but which is not tested may be displayed by changing a color of a background of a corresponding cell; and that a correspondence of a URI and a screen name is taken, and the screen name is also displayed when the URI is displayed, so that the URI is distinguishable.

Further, such a method is also conceivable that when it is found, by this analysis of the screen transition, that the screen transition is not fully exerted, full exertion of the screen transition is suggested without performing the subsequent two-dimensional factor analysis. However, in the present embodiment, the two-dimensional factor analysis is performed even if the screen transition is not fully exerted. This is to support a development approach where a system in which all functions are not implemented from the, but instead a subset of the system is created at first, and the system is finished by repeating tests and function additions.

Then, after the two-dimensional factor analysis is performed, two-dimensional factor analysis result information is generated and stored into the analysis result information storage component 54.

FIG. 16 is a view showing an example of the two-dimensional factor analysis result information.

In the figure, as shown in the first row, the two-dimensional factor analysis result information includes a screen URI1, a parameter name 1, a parameter value 1, a screen URI2, a parameter name 2, a parameter value 2, and an equivalence class flag k1-k2 (k1=1, 2, . . . , k2=1, 2, . . . ).

The screen URI1 is a URI of one of two target screens to be analyzed, the parameter name 1 is a name of a target parameter to be analyzed on the screen, and the parameter values 1 is a value input to the parameter. The screen URI2 is a URI of the other one of the two screens to be analyzed, and the parameter name 2 is a name of a target parameter to be analyzed on the screen, and the parameter value 2 is a value input to the parameter. These pieces of information are taken from one entry of test data.

The equivalence class flag k1-k2 is a flag indicative of whether or not a corresponding parameter value 1 satisfies a range condition of an equivalence class condition k1, which is associated by analysis-setting information with a corresponding screen URI1 and a corresponding parameter name 1, and of whether or not a corresponding parameter value 2 satisfies a range condition of an equivalence class condition k2, which is associated by the analysis-setting information with a corresponding screen URI2 and a corresponding parameter name 2. Here, "ON" indicates that the range conditions are both satisfied, and "OFF" indicates that either of the range conditions is not satisfied.

When the two-dimensional factor analysis result information is stored as such, the two-dimensional factor analysis result screen is displayed in block S416.

FIG. 17 is a view showing an example of the two-dimensional-factor analysis result screen (single combination).

As shown in the figure, the two-dimensional-factor analysis result screen (single combination) displays a factor-combination total, a prohibition-combination total, a tested-combination total, a total number of test times, an untested-combination total, and a parameter-value table, with respect to a combination of a first parameter on a screen designated by a first screen URI and a second parameter on a screen designated by a second screen URI.

The parameter-value table shows a parameter value input to the first parameter and a parameter value input to the second parameter in an identifiable manner in a cell at which a row of a equivalence class including the parameter value input to the first parameter and a column of an equivalence class including the parameter value input to the second parameter intersect with each other. In the figure, as an example, such a format is employed that the parameter value input to the first parameter is shown on the left side of a slash, while the parameter value input to the second parameter is shown on the right side of the slash. More specifically, in the second row of the two-dimensional factor analysis result information of FIG. 16, an equivalence class flag 1-1 is "ON," so that "valb11/valc11" is shown in a cell at which a row of the equivalence class 1 of the first parameter (parb1) and a column of the equivalence class 1 of the second parameter (parc1) intersect with each other.

Further, in this parameter-value table, a cell corresponding to a combination of equivalence classes which have not been tested may be highlighted. For example, in an embodiment, such a configuration is shown in such a cell, and its background color is made red.

Further, in a case where a test cannot be performed on a specific combination of equivalence classes, or the performing of the test on the specific combination is meaningless, an input indicative of performing a process (a prohibition process) of excluding the combination can be performed by clicking a cell corresponding to the combination. In this case, "prohibition" is shown in such a cell, and its background color is changed so as to indicate that the prohibition process is performed. Then, the combination of equivalence classes which is shown as "prohibition" is excluded from the factor-combination total.

That is, among the number of all cells in the parameter-value table, which is 18 in the embodiment shown in FIG. 17, the number of cells except the cell shown as "prohibition," which is 17 in FIG. 17, is displayed as the factor-combination total.

Further, the number of cells shown as "prohibition," which is 1 in the embodiment shown in FIG. 17, is displayed as the prohibition-combination total, and the number of cells except the cells shown as "untested" and the cell shown as "prohibition," which is 15 in FIG. 17, is displayed as the tested-combination total.

Further, as shown in FIG. 17, the test is performed 28 times on the combination of the first parameter and the second parameter, so that this number of test times, which is 28, is displayed as the total number of test times.

Furthermore, the number of cells shown as "untested," which is 2 in FIG. 17, is displayed as the untested-combination total.

Note that, as to this two-dimensional-factor analysis result screen, the collaborative operation with a design tool and a framework can be performed. For example, if information of a combination of parameters to be assumed as "prohibition" can be taken from the design tool or the framework, such a configuration is conceivable that the combination is shown as "prohibition" based on the information thus taken from the design tool or the framework.

Figure 18:
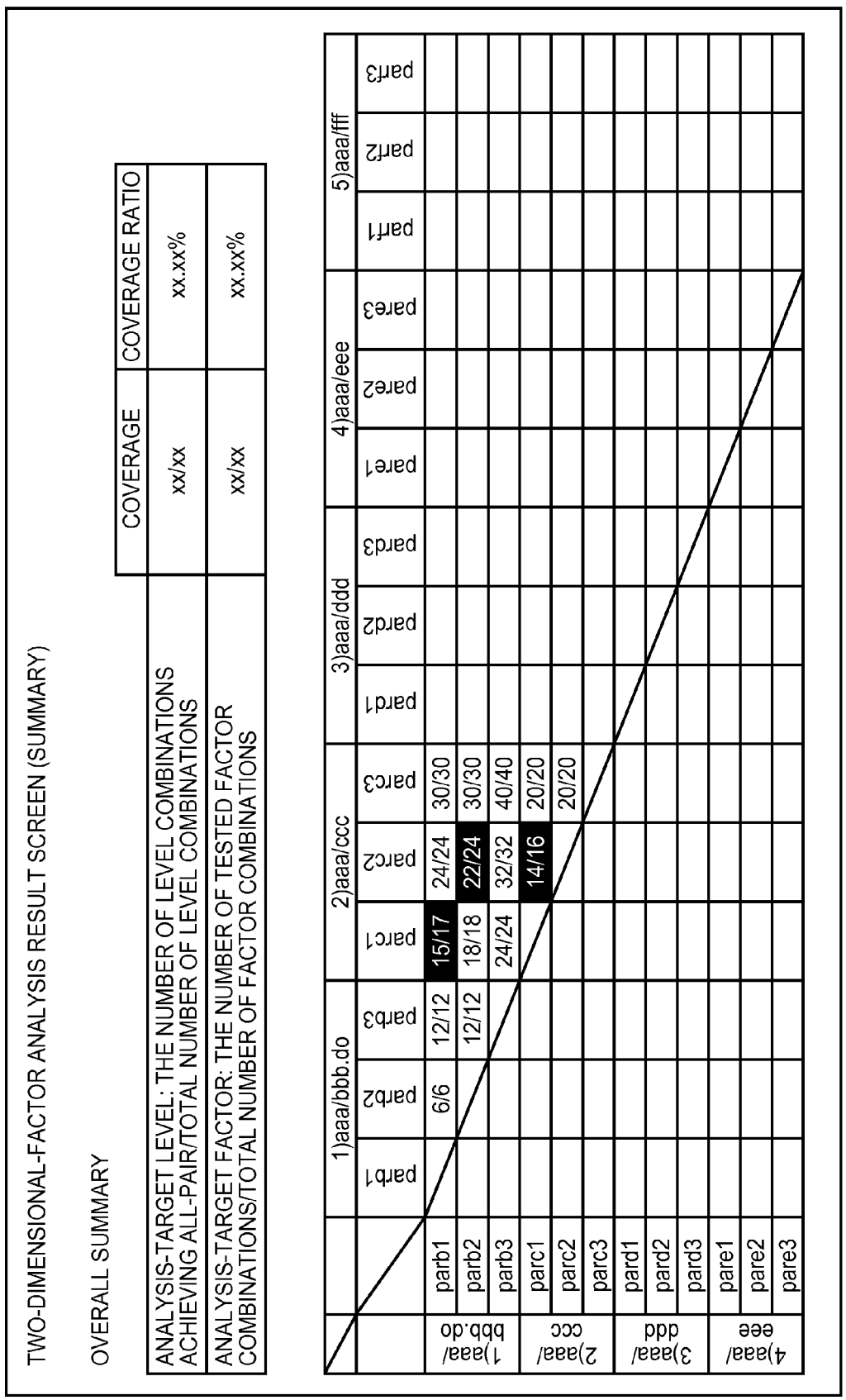
FIG. 18 is a view showing an example of a two-dimensional-factor analysis result screen (summary) to be displayed in a coverage measurement apparatus in an embodiment of the present invention.

Further, FIG. 18 is a view showing an example of the two-dimensional-factor analysis result screen (summary) in accordance with an embodiment.

As shown in the figure, the two-dimensional-factor analysis result screen (summary) displays the coverage and coverage ratio of analysis-target levels, the coverage and coverage ratio of analysis-target factors, and a parameter-combination table.

The parameter-combination table shows, in a cell at which a row of the first parameter and a column of the second parameter intersect with each other, how many combinations have been tested, among combinations of equivalence classes of the first parameter and equivalence classes of the second parameter. More specifically, a denominator indicates the number of combinations of the equivalence classes of the first parameter and the equivalence classes of the second parameter, and a numerator indicates the number of combinations of the equivalence classes which have been tested. For example, as shown in the embodiment in FIG. 18, in regard to the combination of a parameter "parb1" and a parameter "parb2", all of 6 combinations of their equivalence classes have been tested. In contrast, in regard to the combination of the parameter "parb1" and a parameter "parc1", only 15 combinations have been tested among 17 combinations of their equivalence classes excluding the prohibition combination, as shown in FIG. 17. In view of this, in the figure, a cell without any untested combination, like the former example, is shown by a white background, and a cell with an untested combination(s), like the latter example, is shown by a black background.

Further, in this parameter-combination table, when each cell is clicked, a detailed screen about a corresponding combination of parameters is displayed. For example, the screen of FIG. 17 is displayed when a cell at which the row of the parameter "parb1" and the column of the parameter "parc1" intersect with each other is clicked.

The coverage of analysis-target levels is information indicative of how many combinations of parameters there are and how many tested combinations of parameters, in which all combinations of equivalence classes have been tested, there are among the combinations of parameters, and the coverage ratio of analysis-target levels expresses it in percentage. That is, a denominator indicates the number of cells in the upper-right portion of a diagonal line in the combination diagram, and a numerator indicates the number of cells which have a white background and in which a value is shown in the combination diagram.

The coverage of analysis-target factors are indicative of how many combinations of equivalence classes there are and how many combinations of equivalence classes have been tested among them, and the coverage ratio of analysis-target factors expresses it in percentage. That is, a denominator indicates a sum of the numbers on the right side of a slash in the cells of the combination diagram, and a numerator indicates a sum of the numbers on the left side of the slash in the cells of the combination diagram.

Thus, the configuration and operation in the embodiment of the present invention are described in detail as above.

As a summary, the configuration and effect of the embodiment of the present invention are described below.

In the present embodiment, from execution results of test cases, data that can be factors such as input parameter values are analyzed, and the test coverage ratio is calculated on the basis of the test coverage obtained when the equivalence partitioning method or the all-pair method is applied to combination tests. Further, information about what kind and combination of test cases should be additionally performed to improve the coverage ratio is also given.

This makes it possible to save man-hours of test design, thereby resulting in that a test can be started casually. Further, in the present embodiment, a coverage ratio that applies only to a function that can be tested is calculated to improve the coverage ratio within the range of the function. In view of this, the present embodiment is compatible with agile development in which the number of functions to be implemented is increased while tests are repeated.

In the present embodiment, the analysis is performed with a specific screen or screen transition as a starting point, and interfaces (the analysis-target setting screen and the like) for adding an analysis target interactively are provided. In the present embodiment, the analysis is started from a part of the code that is identified as an important part, and a part that is identified as not necessary to be focused on is excluded from analysis targets, thereby making it possible to avoid combination explosion of the analysis targets.

In the present embodiment, an analysis-target factor is selective, and interfaces (the analysis-setting-information input screen and the like) for adding or deleting an analysis-target factor interactively are provided. This enables effective analysis in that an important factor is preferentially analyzed. That is, some parameters are meaningless as factors, and when they are included automatically, combination explosion is easy to happen. However, with this configuration, such a situation is avoidable. Further, information of a target parameter to be analyzed is added interactively, so that analytic matter can be deepened as necessary.

In the present embodiment, the number of passing times of the same screen is counted, so that the number of repetition times of the operation of displaying the same screen is also incorporated into the analysis of the coverage ratio as a factor. This makes it possible to judge the coverage by taking, as a combination factor, the repetition of an operation that often occurs in a web application.

In the present embodiment, a parameter extracted from a screen displayed as a response from the web system 10 is also incorporated into the analysis of the coverage ratio as a factor. This makes it possible to judge the coverage ratio of a combination with a dependent parameter, which cannot be judged by the technique that uses only parameters transmitted to the web system 10.

In the present embodiment, a tested-list screen (the two-dimensional-factor analysis result screen (single combination) or the like) on which a prohibition process (a process to exclude a combination which is not testable or is unnecessary to be tested) is executable is displayed. This allows the prohibition process that had to be performed on the desk for all combinations to be performed by judging, only for a combination that has not been tested yet, whether the combination is not testable or is unnecessary to be tested. As a result, the prohibition process is easily performed.

Although it is not described in the present embodiment, the screen transition may be also incorporated into the analysis of the coverage ratio as one factor. This makes it possible to judge the coverage about a combination of the screen transition and input parameter values.

Further, a name of an embedded button and a direct link are read from a screen displayed as a response from a system, so that which of them is performed during a test may be displayed. With the present embodiment, when there are a plurality of buttons on the screen, a combination of an input parameter and a button is also analyzable. The coverage on how much the direct link is tested can be also shown.

Incidentally, in the present embodiment, it is necessary to perform a test having some coverage before a first analysis is performed. Particularly, the coverage of a screen in a target portion to be analyzed of an application function (that is, a screen necessary to be analyzed appears at least once) is required. However, this point is manageable because normal system development has a screen-design document. For example, a screen-transition analysis result in the coverage measurement apparatus 40 is compared with the screen-design document, so as to check that there is no screen that does not appear.

Figure 19:
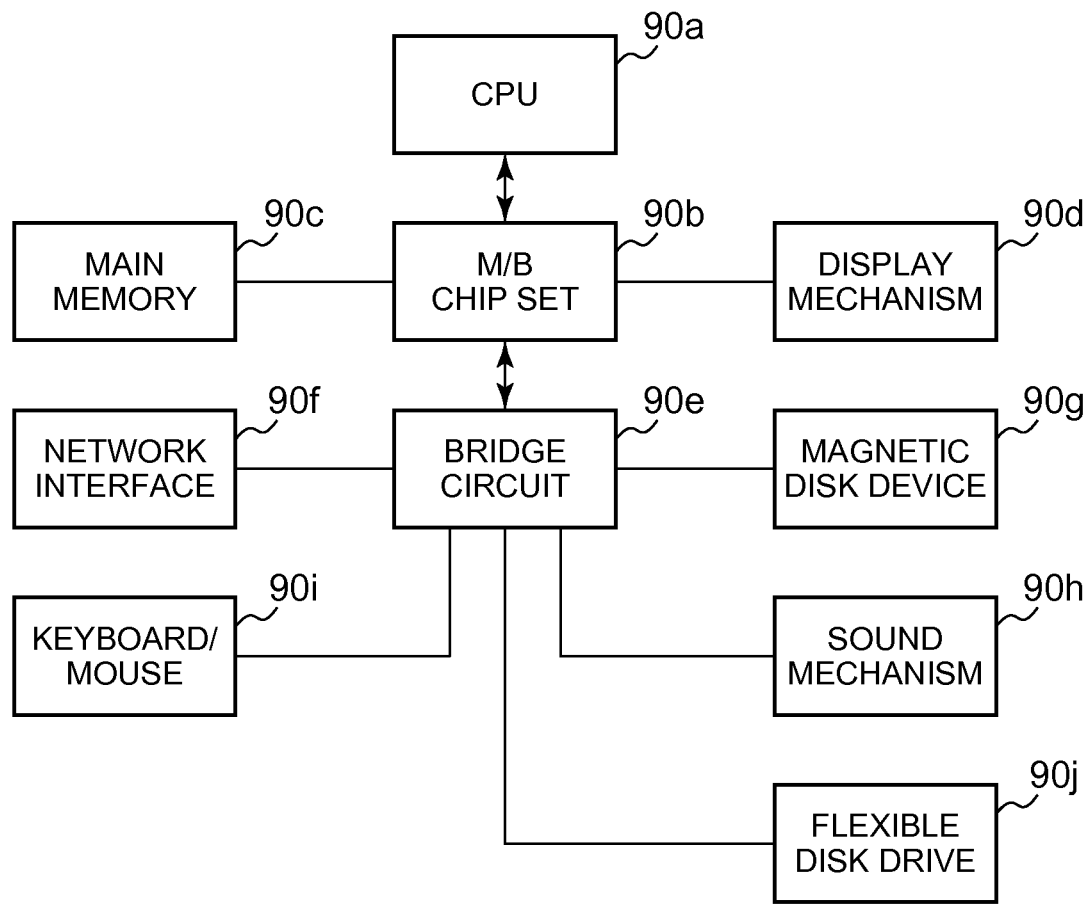
FIG. 19 is a view showing a hardware configuration of a computer which is applicable to an embodiment of the present invention.

Finally, a hardware configuration of a computer that may be utilized by an embodiment is shown in FIG. 19. As shown in the figure, the computer includes: a CPU 90a, which is a computing means; a main memory 90c which is connected to the CPU 90a via a M/B (motherboard) chip set 90b; and a display mechanism 90d which is also connected to the CPU 90a via the M/B chip set 90b. Further, to the M/B chip set 90b, a network interface 90f, a magnetic disk device (HDD) 90g, a sound mechanism 90h, a keyboard/mouse 90i, and a flexible disk drive 90j are connected via a bridge circuit 90e.

Note that, in FIG. 19, these constituents are connected to each other via buses. For example, the CPU 90a and the M/B chip set 90b, and the M/B chip set 90b and the main memory 90c are connected via respective CPU buses. Further, the M/B chip set 90b and the display mechanism 90d may be connected via an AGP (accelerated graphics port), but when the display mechanism 90d includes a video card that supports peripheral component interconnect express (PCIe), the M/B chip set 90b and this video card are connected via a PCIe bus. Further, for connection to the bridge circuit 90e, PCIe can be used, for example, for the network interface 90f. Further, for the magnetic disk device 90g, serial advanced technology attachment (ATA), parallel ATA, or peripheral component interconnect (PCI) can be used, for example. Further, for the keyboard/mouse 90i and the flexible disk drive 90j, a universal serial bus (USB) can be used.

Embodiments described herein provide an apparatus for evaluating the coverage of a test of software operating on a server when a client performs the test. The apparatus includes: a storage component for storing log data of a plurality of tests including a set of a plurality of input values, which set is composed of a set of input values, which are input to two input fields on at least one screen and transmitted to the server, in each of the plurality of tests using the at least one screen displayed on the client; an analysis component for analyzing to what extent the set of the plurality of input values included in the log data stored in the storage component cover a set of values which should be input to the two input fields in the plurality of tests; and an output component for outputting a result of the analysis obtained by the analysis component.

This apparatus may further include: a receiving component for receiving designation of a set of specific values which should be excluded from test targets among the set of the plurality of input values, wherein the analysis component analyzes to what extent the set of the plurality of input values included in the log data stored in the storage component cover a set of values obtained by excluding the set of specific values from the set of values which should be input to the two input fields in the plurality of tests.

A further embodiment is an apparatus for evaluating the coverage of a test of software operating on a server when a client performs the test. The apparatus includes: a storage component for storing log data of a plurality of tests including correspondence information in which each input field among a plurality of input fields on at least one screen is associated with input values which are input to the each input field and transmitted to the server, in each of the plurality of tests using the at least one screen displayed on the client; an extraction component for extracting the plurality of input field from the correspondence information included in the log data stored in the storage component; a receiving component for receiving a selection of at least two input fields from the plurality of input fields extracted by the extraction component; a first analysis component for analyzing to what extent a plurality of input values composed of input values which are associated with a specific input field of the at least two input fields in the correspondence information cover values which should be input to the specific input field in the plurality of tests; a second analysis component for analyzing to what extent a set of a plurality of input values, which set is composed of a set of input values which are associated with a first input field of the at least two input fields in the correspondence information, and input values which are associated with a second input field of the at least two input fields in the correspondence information, covers a set of values which should be input to the first input field and the second input field in the plurality of tests; and an output component for outputting a result of the analysis obtained by the first analysis component and a result of the analysis obtained by the second analysis component.

Furthermore, an embodiment of the present invention provides a method for evaluating the coverage of a test of software operating on a server when a client performs the test. The method includes: storing, in a storage component, log data of a plurality of tests including a plurality of input values composed of input values, which are input to a specific input field on a specific screen and transmitted to the server, in each of the plurality of tests using the specific screen displayed on the client; analyzing to what extent the plurality of input values included in the log data stored in the storage component cover values which should be input to the specific input field in the plurality of tests; and outputting a result of the analysis.

Furthermore, an embodiment of the present invention also provides a program for causing a computer to function as an apparatus for evaluating the coverage of a test of software operating on a server when a client performs the test. The program causes the computer to function as: a writing component for writing, in a storage component, log data of a plurality of tests including a plurality of input values composed of input values, which are input to a specific input field on a specific screen and transmitted to the server, in each of the plurality of tests using the specific screen displayed on the client; an analysis component for analyzing to what extent the plurality of input values included in the log data written in the storage component cover values which should be input to the specific input field in the plurality of tests; and an output component for outputting a result of the analysis obtained by the analysis component.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. An apparatus for evaluating coverage of a test of software operating on a server when a client performs the test, the apparatus comprising:
   a storage component comprising a memory for storing log data of a plurality of tests, the log data including a plurality of input values that are input to a specified input field on a specified screen and transmitted to the server in each of the plurality of tests that use the specified screen displayed on the client;
   an analysis component comprising a processor for performing analysis, the analysis including:
      receiving equivalence class information for a plurality of equivalence classes corresponding to the specified input field on the specified screen, each of the plurality of equivalence classes comprising a range value, an upper-limit value, and a lower-limit value;
      for each of the plurality of input values, setting an equivalence class flag for each of the plurality of equivalence classes indicating whether the input value satisfies each of the range value, the upper-limit value, and the lower-limit value of the equivalence class, such that three equivalence class flags are set for each input value for each equivalence class; and
      determining, based on the equivalence class flags of each of the plurality of input values, a coverage ratio of the plurality of tests; and
   an output component for outputting a result of the analyzing from the analysis component based on the coverage ratio.

2. The apparatus according to claim 1, further comprising a receiving component for receiving a selection of the specified input field from a plurality of input fields on the specified screen.

3. The apparatus according to claim 1, wherein:
   the log data further includes a plurality of setting values that are set according to the input values in the server and transmitted to the client in each of the plurality of tests; and
   the analysis further includes analyzing the plurality of setting values according to the input values that are input to the specified input field in the plurality of tests in order to determine the coverage ratio.

4. The apparatus according to claim 1, wherein:
   the log data further includes a number of times that the display of the specified screen has been repeated in each of the plurality of tests; and
   the analysis further includes analyzing the number of times that the display of the specified screen has been repeated in each of the plurality of tests in order to determine the coverage ratio.

5. The apparatus according to claim 1, further comprising a receiving component for receiving designation of a specified set of values of the input values to exclude from the tests.

6. The apparatus according to claim 1, wherein the software is web application software.

7. A method for evaluating coverage of a test of software operating on a server when a client performs the test, the method comprising:
storing log data of a plurality of tests, the log data including a plurality of input values that are input to a specified input field on a specified screen and transmitted to the server in each of the plurality of tests that use the specified screen displayed on the client;
analyzing, on a processor, the plurality of input values, the analyzing comprising:
receiving equivalence class information for a plurality of equivalence classes corresponding to the specified input field on the specified screen, each of the plurality of equivalence classes comprising a range value, an upper-limit value, and a lower-limit value;
for each of the plurality of input values, setting an equivalence class flag for each of the plurality of equivalence classes indicating whether the input value satisfies each of the range value, the upper-limit value, or the lower-limit value of the equivalence class, such that three equivalence class flags are set for each input value for each equivalence class; and
determining, based on the equivalence class flags of each of the plurality of input values, a coverage ratio of the plurality of tests; and
outputting a result of the analyzing based on the coverage ratio.

8. The method according to claim 7, further comprising receiving a selection of the specified input field from a plurality of input fields on the specified screen.

9. The method according to claim 7, wherein the log data further includes a plurality of setting values that are set according to the input values in the server and transmitted to the client in each of the plurality of tests, and the method further comprises analyzing the plurality of setting values according to the input values that are input to the specified input field in the plurality of tests in order to determine the coverage ratio.

10. The method according to claim 7, wherein the log data further includes a number of times that the display of the specified screen has been repeated in each of the plurality of tests, and the method further comprises analyzing the number of times that the display of the specified screen has been repeated in each of the plurality of tests in order to determine the coverage ratio.

11. The method according to claim 7, further comprising receiving designation of a specified set of values of the input values to exclude from the tests.

12. The method according to claim 7, wherein the software is web application software.

13. A computer program product for evaluating coverage of a test of software operating on a server when a client performs the test, the computer program product comprising:
A non-transitory computer readable storage medium having computer readable program code embodied therewith, the computer readable program code comprising:
computer readable program code configured for:
analyzing, on a processor, the plurality of input values, the analyzing comprising:
receiving equivalence class information for a plurality of equivalence classes corresponding to the specified input field on the specified screen, each of the plurality of equivalence classes comprising a range value, an upper-limit value, and a lower-limit value;
for each of the plurality of input values, setting an equivalence class flag for each of the plurality of equivalence classes indicating whether the input value satisfies each of the range value, the upper-limit value, and the lower-limit value of the equivalence class, such that three equivalence class flags are set for each input value for each equivalence class; and
determining, based on the equivalence class flags of each of the plurality of input values, a coverage ratio of the plurality of tests; and
outputting a result of the analyzing based on the coverage ratio.

14. The computer program product according to claim 13, wherein the computer readable program code is further configured for receiving a selection of the specified input field from a plurality of input fields on the specified screen.

15. The computer program product according to claim 13, wherein the log data further includes a plurality of setting values that are set according to the input values in the server and transmitted to the client in each of the plurality of tests, and the computer readable program code is further configured for analyzing plurality of setting values according to the input values that are input to the specified input field in the plurality of tests in order to determine the coverage ratio.

16. The computer program product according to claim 13, wherein the log data further includes a number of times that the display of the specified screen has been repeated in each of the plurality of tests, and the computer readable program code is further configured for analyzing the number of times that the display of the specified screen has been repeated in each of the plurality of in order to determine the coverage ratio.

17. The computer program product according to claim 13, wherein the computer readable program code is further configured for receiving designation of a specified set of values of the input values to exclude from the tests.

* * * * *